Sept. 13, 1966 W. R. GALLAGHER 3,272,338
SEWAGE DISPOSAL SYSTEM
Filed March 9, 1964 3 Sheets-Sheet 2
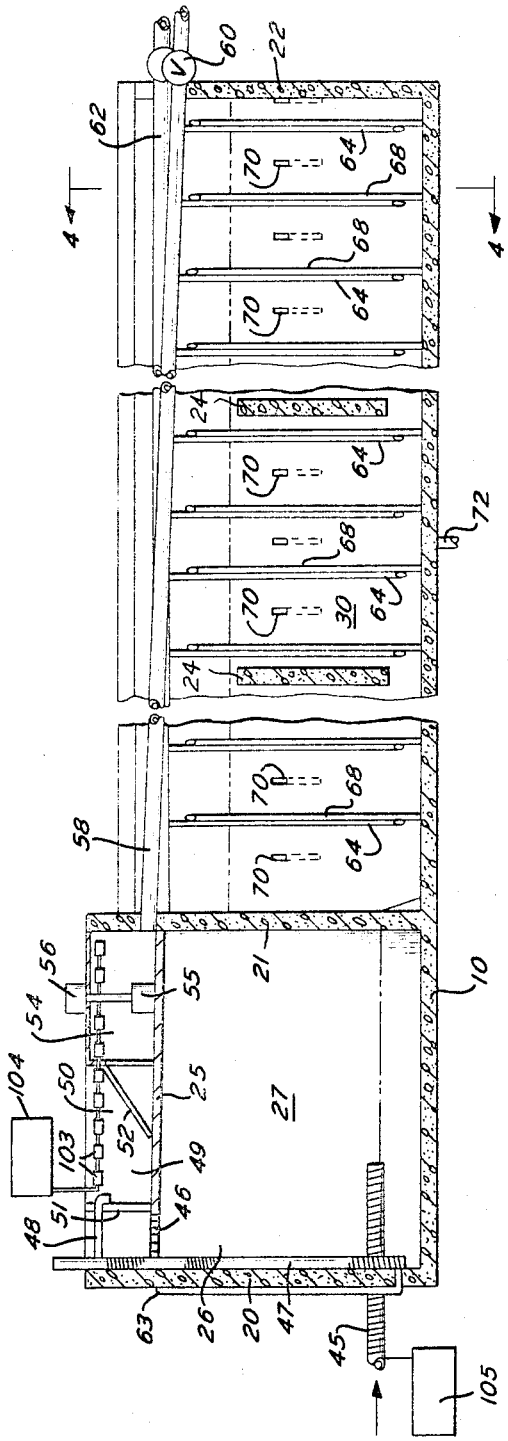
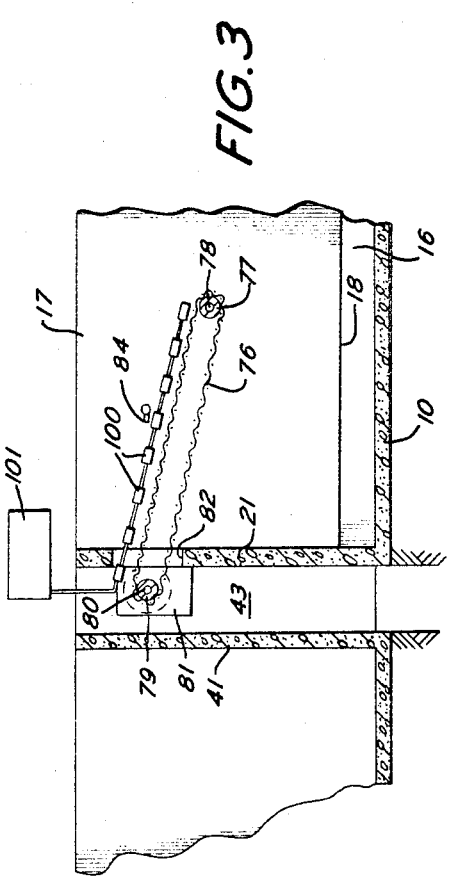
INVENTOR
WILLIAM R. GALLAGHER
BY
ATTORNEY Sept. 13, 1966      W. R. GALLAGHER      3,272,338

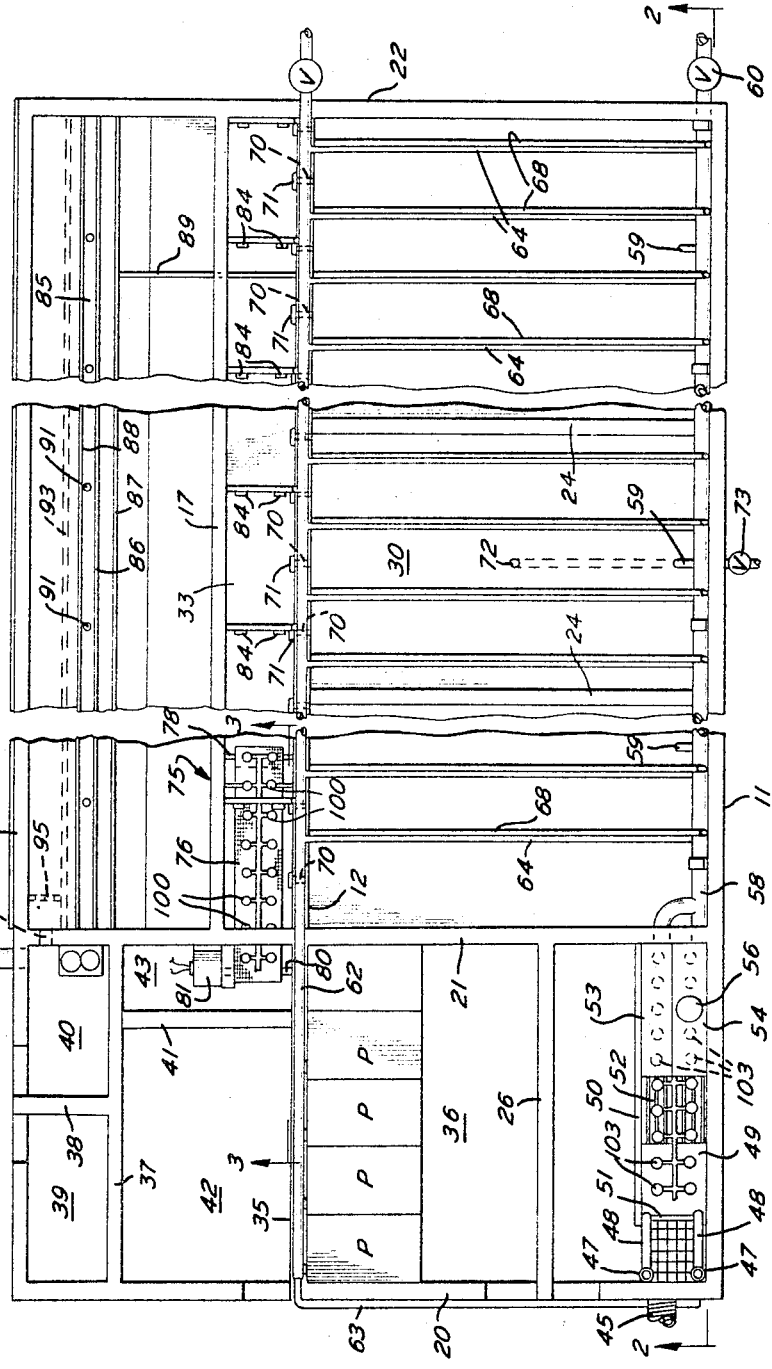

SEWAGE DISPOSAL SYSTEM

Filed March 9, 1964      3 Sheets-Sheet 3

INVENTOR
WILLIAM R. GALLAGHER

BY *Z. T. Wolbensmith 2nd*
ATTORNEY

United States Patent Office 3,272,338
Patented Sept. 13, 1966

3,272,338
SEWAGE DISPOSAL SYSTEM
William R. Gallagher, 1041 Township Line Road, Jenkintown, Pa.
Filed Mar. 9, 1964, Ser. No. 350,289
14 Claims. (Cl. 210—177)

This invention relates to sewage disposal systems and more particularly to apparatus for the treatment of human wastes of organic nature, such as those of residential areas, schools and the like.

Various types of sewage disposal systems have heretofore been proposed but these have had various objectionable features including complication of equipment, high maintenance costs, high cost for disposal of residues, objectionable odors during operation, hazards to operators, unpleasant effect on environment, and other objectionable features.

It is the principal object of the present invention to provide a sewage disposal system for accommodating the normal sewage resulting from residential and other operations and for treating the organic wastes in a simple but effective manner.

It is a further object of the present invention to provide, in a system of the character aforesaid, simple but effective apparatus for subjecting the wastes to oxidization with agitation.

It is a further object of the present invention to provide, in a system of the character aforesaid, for the removal of the organic materials which are not readily oxidized by agitation with air.

It is a further object of the present invention to provide, in apparatus of the character aforesaid, simple but effective provisions for the return for further treatment of untreated or incompletely treated wastes which settle in predetermined locations.

It is a further object of the present invention to provide, in a system of the character aforesaid, discharge elements for normal flow and for separate handling with high flow.

It is a further object of the present invention to provide a system of the character aforesaid which requires a minimum of supervision and which is, in effect, automatic in its operation.

It is a further object of the present invention to provide, in a system of the character aforesaid, treating apparatus which does not require any submerged mechanical equipment in the tanks.

It is a further object of the present invention to provide sewage treatment apparatus which utilizes atmospheric air as the major treating medium.

It is a further object of the present invention to provide sewage treatment apparatus in which air is used for treating, for handling portions of the material being treated, and for separation of separated floating materials.

It is a further object of the present invention to provide sewage treatment apparatus which is capable of being made in various sizes in accordance with the quantities of waste, measured in gallons per day, to be treated.

It is a further object of the present invention to provide sewage treating apparatus from which the end products do not present any hazards to the community nor problems of disposal.

Other objects and advantageous features of the invention will be apparent from the description and claims.

The nature and characteristic features of the invention will be more readily understood from the following description taken in connection with the accompanying drawings forming part thereof, in which:

FIGURE 1 is a top plan view of a sewage treatment system in accordance with the invention;

FIG. 2 is a vertical longitudinal sectional view taken approximately on the line 2—2 of FIG. 1;

FIG. 3 is an enlarged fragmentary vertical sectional view taken approximately on the line 3—3 of FIG. 1.

Figure 4:
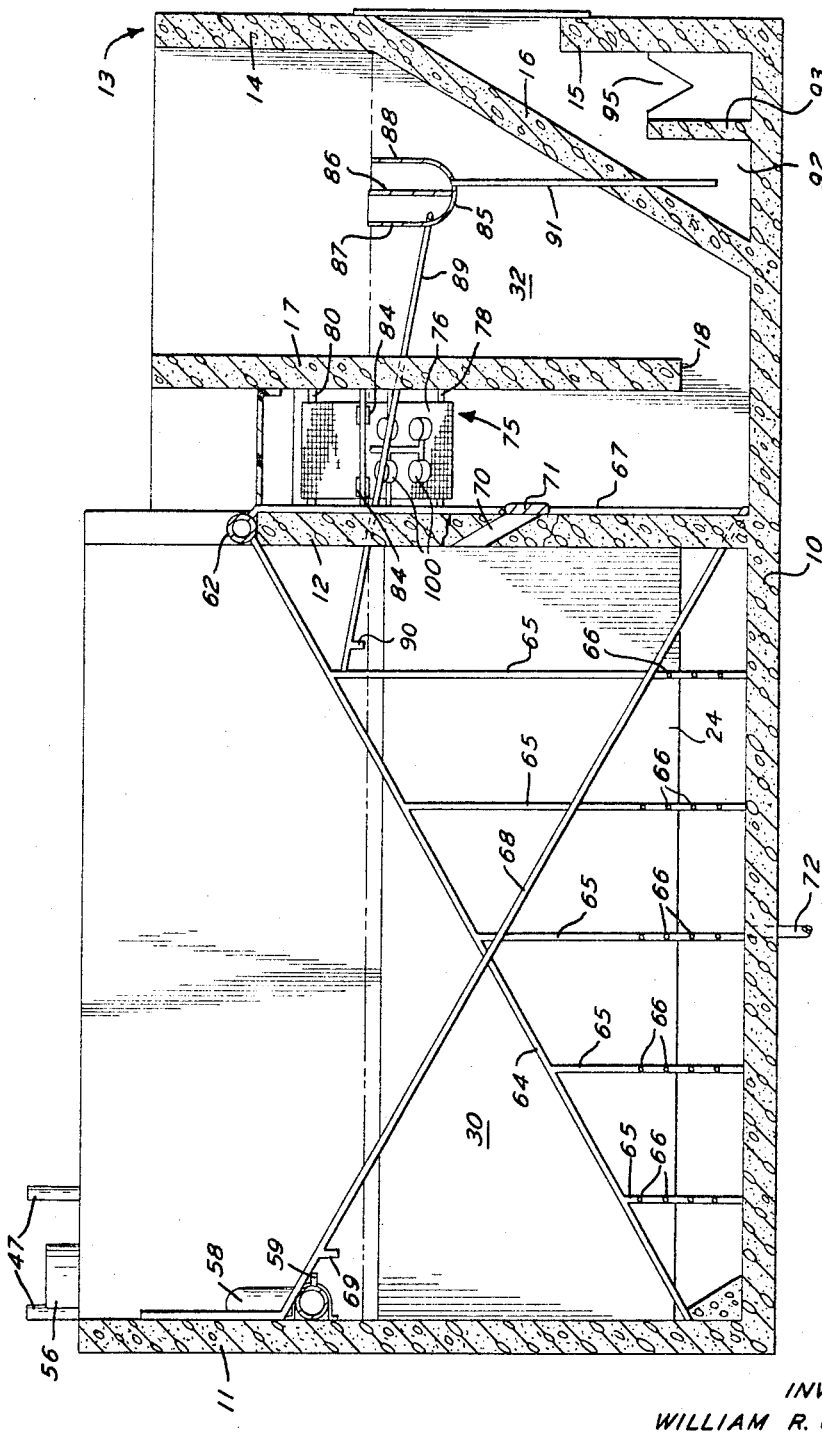
FIG. 4 is a vertical transverse sectional view, enlarged, taken approximately on the line 4—4 of FIG. 2.

It should, of course, be understood that the description and drawings herein are illustrative merely, and that various modifications and changes can be made in the structure disclosed without departing from the spirit of the invention.

Like numerals refer to like parts throughout the several views.

The sewage disposal system in accordance with the present invention preferably includes a unitary arrangement of components including a surge tank to accommodate variations in inflow of the wastes to be treated, an aerating treating tank having provisions for delivery of the sewage to be treated and for release of air beneath the liquid level therein, a settling tank in communication with the aerating tank with a section for scum collection and removal, and provisions for discharge from the settling tank. Also included is discharge structure for normal flow and additional provisions for high flow with return of portions of the material for reprocessing.

The circulation of the wastes being treated, the return of untreated or partially treated materials, and the collection of the scum are preferably all carried out by the use of air under pressure.

Provision is also made for the disposal of combustible materials, collected as scum on the surface of a portion of the liquid.

Referring now more particularly to the drawings, the treating apparatus in accordance with the invention preferably includes walls, hereinafter to be described, made of reinforced concrete so as to be water tight and free from erosion and corrosion. For this purpose, a horizontal bottom wall or floor 10 is provided having a vertical side wall 11 extending therealong with an intermediate vertical side wall 12 in spaced parallel relation thereto. An outer parallel side wall 13 is also provided having spaced upper and lower vertical sections 14 and 15 and an inwardly inclined section 16 extending from the upper section 14 to the floor 10.

A vertical separating wall 17 parallel to the walls 12 and 13 is also provided extending vertically downwardly from the level of the top of the wall section 14 and having a lower terminus in spaced relation to the floor 10 to permit liquid flow around this lower terminus 18.

An outer vertical end wall 20 is provided connecting the walls 11 and 13. The end wall 20 has in spaced or parallel relation thereto an inner vertical wall 21 connecting the walls 11 and 13, and an opposite vertical parallel end wall 22 is provided connecting the walls 11 and 13.

Between the walls 21 and 22 spaced bracing walls 24 are provided terminated above the floor 10 and below the normal liquid level to permit free circulation.

A horizontal wall 25 is provided spaced downwardly from the upper margins of the walls 20 and 21, and a vertical partition wall 26 is provided extending from the wall 20 to the wall 21 in spaced relation to the wall 11 and provides with the walls 20 and 21 and the floor 10, a surge tank 27 for the initial reception of the materials to be treated. The walls 11, 12, 21 and 22, with the floor 10, define an aeration tank 30. The walls 12, 14, 21 and 22, with the floor 10, provide a settling tank 32, while the wall 17 with the walls 12, 21, and 22 provide a separate location 33 for the collection and removal of buoyant materials as scum, while the remainder of the settling tank 32 provides a location wherein heavier than water materials may settle to the bottom.

A portion 35 of the wall 12 separates a room 36 for the location of a plurality of motor driven air pumps P for supplying the air for the operation of the system.

A wall 37 in spaced relation to the wall 13 may be provided having a wall 38 extending therefrom to the wall 13 to separate a small space 39 which can be utilized for laboratory purposes and a room 40 which can serve as a chlorinating room. A partition 41 between the walls 26 and 12 separates spaces 42 and 43 one of which can serve as a storage room and one of which may have suitable provisions therein for disposal of combustible solids, as hereinafter pointed out.

The surge tank 27 has an inlet pipe 45 connected thereto for the delivery of the sewage from the source. A grill covered access opening 46 can be provided in the wall 25 for access to the interior of the surge tank 27.

In order to deliver the sewage from the surge tank 27 an air lift is preferably provided which includes a plurality of upright pipes 47 extending at their lower ends to a location close to the bottom of the surge tank 27 and with side delivery pipes 48 at their upper ends for delivery of material to a channel 49 bounded by a side partition wall 50 and by an end partition wall 51. The channel 49 preferably has an inclined grid 52 interposed therein for determining the size of material delivered therebeyond, and for this purpose one half inch diameter rods spaced about one-half inch apart is satisfactory. The channel 49 beyond the grid 52 is divided into a pair of channels 53 and 54, one of which has a motor driven shredder or comminutor 55 therein. The motor 56 of the comminutor is disposed above the channel 54. The other channel 55 can be employed as desired as a bypass around the comminutor 55. The outlets of the channels 53 and 54 are connected to a sewage delivery pipe 58 which runs along the wall 11. The pipe 58 has a plurality of outlet pipes 59 extending therefrom at desired locations therealong. A normally closed valve 60 can be provided at the end of the pipe 58 for flushing the pipe 58 from time to time in the event that this is desired.

The air pumps P are connected to an air supply header or duct 62 which can advantageously extend along the wall 12 and from which air supply pipes 63 extend to the airlift pipes 47 to supply the actuating air.

The duct 62 has extending therefrom a plurality of inclined pipes 64 each of which has spaced downwardly extending discharge pipes 65 connected thereto. The pipes 65 have rings of holes 66 of diameters of about one sixty-fourth of an inch at two-inch levels from about two feet below the top surface of the liquid to about two feet above the bottom wall or floor 10.

The duct 62 also has a downwardly extending pipe 67 which discharges air into a plurality of upwardly inclined air lift pipes 68 supported at their upper ends by the wall 11 and with discharge connections 69 for the delivery of material to be treated from adjacent the floor 10 in the settling tank 32 back to the aeration tank 30.

The wall 12, at a plurality of spaced locations therealong has downwardly inclined ports 70 leading from the aeration tank 30 into the settling tank 32, these preferably each being provided with a hinged flap valve 71 which tends to close by gravity but is closed if greater pressure is exerted from the settling tank 32 to permit draining of the aeration tank 30 through a drain pipe 72 having a drain control valve 73 therein.

The collection location 33, at one end thereof, is preferably provided with an elevator conveyor 75. The conveyor 75 preferably comprises an endless belt 76 in the form of a wire screen carried at its lower end on a pulley 77 mounted on a shaft 78 and on its upper end within the chamber 43 on a pulley 79 carried on a shaft 80 operated from a driving motor 81.

The wall 21 preferably has a suitable opening 82 therethrough for the conveyor belt 76. The collecting location 33 preferably has disposed therealong, at spaced intervals, a plurality of air nozzles 84 connected to the air supply pipe 67 and directed along the surface of the liquid therein for impelling any collected solids to the conveyor belt 76 for removal from the liquid surface and delivery toward the chamber 43.

The settling tank 32 preferably has extending therealong a collector channel 85 of substantially U shape in transverse cross section and extending from the wall 21 to the wall 22 with a center partition 86. One side wall 87 is preferably at a higher level of the order of three-eighths of an inch higher than the other side wall 88. A plurality of air lift pipes 89 connected to the air duct 62 communicate with the side of the channel 85 between the partition 86 and the side wall 87, extend through the walls 17 and 12 and have delivery pipes 90 for the return of material to the aeration tank 30. On the other side of the partition 86, a plurality of discharge pipes 91 extend downwardly, through the wall 16, and into a channel 92 bounded by the wall 16, the bottom wall or floor 10 and by longitudinally extending wall 93. The wall 93 is preferably terminated a short distance from the wall 22. A V-notch weir 95 is provided at the end of the wall 92 over which the liquid passes for delivery through a passageway 96 into the chlorination room 40 where chlorine gas is brought into intimate contact therewith in a well known manner.

The liquid from the chamber 40, after chlorination, can be discharged through a discharge pipe 97 and dumped into a stream bed, sewer or any other desired location for liquid disposal.

While any desired structure may be employed for disposal of the particular waste collected and delivered by the conveyor belt 76 toward the disposal room 43 it is preferred to utilize incineration both to reduce the bulk to a minimum and also to remove possible contaminants.

For this purpose it is preferred to employ a plurality of microwave transmitting tubes 100 connected to a suitable master oscillator power amplifier system 101. The location of the tubes 100 at a plurality of spaced locations along and across the upper run of the belt 76 in spaced relation thereto provides for subjecting the belt carried material to microwave action. These waves, at a frequency range from $10^9$ to $10^{11}$ c.p.s., and preferably at about mid range, provide a quick and effective heating action on the wet cellulosic and other materials at this location so that these materials are incinerated during their movement with the belt 76. The belt 76 can be made of non-reactive components such as stainless steel, glass fibers, ceramic fibers, or the like.

It is also preferred to apply a heating and material agitating action at other locations in the system and for this purpose a plurality of microwave transmitting tubes 103 with their control system 104 can be provided along the channels 49, 53 and 54 at spaced locations therealong. Also, if desired, the input pipe 45 and the air lift pipe 47 can be made of comminuted quartz crystals united in a non-reactive synthetic plastic material such as polyvinyl chloride and with a helically disposed similarly plastic insulated wire wrapping for input into the plastic carried quartz crystals with turns of the wire spaced about one-quarter to one-half an inch. The input wire is connected to a suitable input source 105.

The mode of operation will now be pointed out.

Sewage or fluent waste introduced at the pipe 45 passes into the surge tank 27 from which it is raised in the airlift pipes 47 and delivered to the channel 49. From the channel 49, dependent upon the flow path selected, the waste to be treated passes through the grid 52 and either along the channel 54 where solids are comminuted by the comminutor 55 or bypassed through the channel 54, and are delivered through the pipe 58 and the outlet pipes 59 and into the aeration tank 30.

In the aeration tank 30 as a result of previous action an activated sludge is present which assists in the precipitation of colloidal and soluble pollution, facilitates the desired oxidizing action, and aids in the formation of new activated sludge. At initial starting up a period of several days is required for the sludge formation.

In the main, small particles, other than cellulosic content from paper delivered with the sewage, are made soluble and then precipitated, this being effected by enzymes produced by the activated sludge culture. The oxidation of the activated sludge produces carbon dioxide, which passes off as a gas, and water.

The pumps P supply air to the air supply duct 62 from which part is delivered to the air lift pipes 47 and the major portion of which is delivered through the pipes 64 and therefrom to the pipes 65 for discharge through the openings 66 into the tank 30. The air thus discharged is effective for agitating the liquid, at the same time providing oxygen for effecting the oxidizing action on the sludge, the formation of additional sludge, and thus of the treatment of the sewage.

Part of the liquid from the tank 30 passes through the ports 70 in the wall 12 to the settling tank 32.

In the tank 32 the fluid is relatively quiet and free from agitation so that heavier particles settling to the floor 12 are picked up by the air lift pipes 68 and returned through the discharge connection 69 to the tank 30 for further aeration.

In the tank 32 the lighter than water particles and particularly cellulosic or paper wastes tend to rise in the space between the walls 12 and 17 where they are advanced by air from the nozzles 84 to and onto the conveyor belt 76.

The belt 76, as it advances, causes the materials collected thereon to be subjected to the microwave action which results in incineration. Only a relatively small quantity of ash remains for removal at this location.

The normal overflow of liquid in the settling tank 32 passes over the top of the sidewall 88 into the collector channel 85 and is delivered through the pipes 91 to the channel 92 from which the liquid passes over the V-notch weir 95 and through the passageway 96 to the chlorinating chamber 40 for release thereinto of chlorine or other effective disinfectant substance, prior to discharge through the pipe 97 for delivery into a stream bed or the like.

For higher level conditions in the tank 32, solids may pass into the part of the channel 85 between the center partition 86 and the side wall 87 for delivery by the air lift pipes 89 back into the tank 30.

The use of microwave conduits for the pipes 45 and 47 permits of heating the material passing therealong and further provides for agitation which tends to reduce the particle sizes and with the pipe 47 having air therein provides an oxidizing action.

It will thus be seen that simple but effective apparatus has been provided for carrying out the objects of the invention.

I claim:
1. In a sewage disposal system, an aeration tank, a sewage supply pipe for delivering sewage into said aeration tank, a settling tank extending along said aeration tank and separated therefrom by a common wall, said common wall having delivery openings therethrough communicating said tanks, a downwardly extending separating wall in said settling tank in spaced relation to said common wall and terminating above the bottom of said settling tank, said separating wall and said common wall providing a chamber therebetween for the collection of floatable material, a source of air under pressure, a plurality of pipes connected to said source and provided at spaced locations along said aeration tank, each pipe having a downwardly extending portion with a plurality of discharge openings intermediate the top and bottom of the liquid in said aeration tank, air lift means connected to said source and extending from said collection chamber for the return of material from said settling tank to said aeration tank, fluid discharge means for delivery of fluid from said settling tank at a predetermined level, air delivery members for impelling floatable material along said collection chamber, and a conveyor member for receiving and removing the floatable material.

2. A sewage disposal system as defined in claim 1 in which a surge tank is provided in advance of said aeration tank.

3. A sewage disposal system as defined in claim 2 in which said surge tank has a sewage supply pipe connected thereto and said surge tank supply pipe has a microwave heating member associated therewith.

4. A sewage disposal system as defined in claim 1 in which a surge tank is provided in advance of said aeration tank, and air lift means is provided for removal of fluid from said surge tank for delivery to said sewage supply pipe.

5. A sewage disposal system as defined in claim 4 in which said source of air is connected to said air lift means.

6. A sewage disposal system as defined in claim 4 in which said air lift means has a microwave heating device for heating fluent material therein.

7. A sewage disposal system as defined in claim 1 in which said delivery openings have non-return valve members associated therewith.

8. A sewage disposal system as defined in claim 1 in which said conveyor member has a microwave heating member associated therewith.

9. A sewage disposal system as defined in claim 1 in which said conveyor member has an endless screen belt and extends to a location outside said settling tank for waste discharge.

10. A sewage disposal system as defined in claim 9 in which said conveyor belt has a microwave heating member associated therewith.

11. A sewage disposal system as defined in claim 1 in which said fluid discharge means has a divided channel, said channel has a plurality of outer bounding walls for fluid flow thereover, one of which is higher than the other, the portion of the channel having the higher bounding wall having an air lift connection thereto for return of fluent material to said aeration tank.

12. A sewage disposal system as defined in claim 11 in which the other portion of the channel has fluid discharge connections extending therefrom.

13. A sewage disposal system as defined in claim 1 in which said sewage supply pipe extends along one wall of said aeration tank and an air supply duct interposed between said source of air and said pipes extends along an opposite wall of said aeration tank.

14. A sewage disposal system as defined in claim 1 in which an opposite pair of end boundary walls of said settling tank are extensions of the end walls of said aeration tank.

References Cited by the Examiner
UNITED STATES PATENTS

| | | | |
|---|---|---|---|
| 2,628,190 | 2/1953 | Langdon | 210—525 X |
| 3,202,285 | 8/1965 | Williams | 210—195 |

REUBEN FRIEDMAN, *Primary Examiner.*

J. DECESARE, *Assistant Examiner.*